United States Patent
Liu et al.

(10) Patent No.: US 9,317,607 B2
(45) Date of Patent: Apr. 19, 2016

(54) EXECUTING A FAST CRAWL OVER A COMPUTER-EXECUTABLE APPLICATION

(71) Applicant: Microsoft Corporation, Redmond, WA (US)

(72) Inventors: Jie Liu, Medina, WA (US); Suman Nath, Redmond, CA (US); Xiaozhu Lin, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 13/771,087

(22) Filed: Feb. 20, 2013

(65) Prior Publication Data

US 2014/0236919 A1      Aug. 21, 2014

(51) Int. Cl.
*G06F 17/30* (2006.01)
(52) U.S. Cl.
CPC .............................. *G06F 17/30864* (2013.01)
(58) Field of Classification Search
CPC .................................................. G06F 17/30864
IPC .................................................. G06F 17/30864
See application file for complete search history.

(56) References Cited

U.S. PATENT DOCUMENTS

| | | | |
|---|---|---|---|
| 6,631,369 B1 * | 10/2003 | Meyerzon et al. | 707/999.004 |
| 7,328,401 B2 | 2/2008 | Obata et al. | |
| 7,676,553 B1 * | 3/2010 | Laucius et al. | 709/219 |
| 2008/0077556 A1 | 3/2008 | Muriente | |
| 2010/0205168 A1 * | 8/2010 | Yang et al. | 707/709 |
| 2011/0055194 A1 * | 3/2011 | Ghosh | 707/709 |
| 2012/0041936 A1 | 2/2012 | Yu et al. | |
| 2012/0143844 A1 | 6/2012 | Wang et al. | |
| 2012/0191694 A1 | 7/2012 | Gardiol et al. | |
| 2013/0332442 A1 * | 12/2013 | Liu et al. | 707/709 |

OTHER PUBLICATIONS

Nath et al. "App Crawler: Opening Mobile App Black Boxes", published at http://research.microsoft.com, Nov. 13, 2012.*
Amalfitano, et al., "A GUI Crawling-based Technique for Android Mobile Application Testing", Retrieved at <<http://www.cs.umd.edu/~atif/testbeds/TESTBEDS2011-papers/Amalfitano.pdf>>, In IEEE Fourth International Conference on Software Testing, Verification and Validation Workshops (ICSTW), Mar. 25, 2011, pp. 1-10.
Kocher, Jill, "SEO for Mobile Apps and App Stores", Retrieved at <<http://www.practicalecommerce.com/articles/3411-SEO-for-Mobile-Apps-and-App-Stores<<, Mar. 9, 2012, pp. 1-2.
Yohanes, et al., "Focused Crawler Optimization Using Genetic Algorithm", Retrieved at <<http://telkomnika.ee.uad.ac.id/n9/files/Vol.9No.3Des11/1SS-AI9.3.12.11.01.pdf>>, In the Proceedings of TELKOMNIKA, vol. 9, No. 3, Dec. 2011, pp. 1-8.
"Search Engine Optimization Crawling", Retrieved at <<http://www.seocox.com/seo-singapore-blog/seo-article-blog/search-engine-optimization-crawling>>, Retrieved Date: Oct. 21, 2012, pp. 1-3.

* cited by examiner

*Primary Examiner* — Khanh Pham
(74) *Attorney, Agent, or Firm* — Steve Wight; Sandy Swain; Micky Minhas

(57) ABSTRACT

Technologies related to crawling computer-executable applications are described. A full crawl is executed over an application, where executing the full crawl includes causing the application to output a plurality of pages. The application retrieves content from the World Wide Web when generating the pages for output. Thereafter, a fast crawl is executed over the application, where executing the fast crawl takes less time when compared to the time needed to execute the full crawl.

20 Claims, 12 Drawing Sheets

EXECUTING A FAST CRAWL OVER A COMPUTER-EXECUTABLE APPLICATION

BACKGROUND

An application is computer software that is designed to perform a particular task. Exemplary conventional applications include web browsers, word processing applications, spreadsheet applications, presentation applications, etc. Recently, due to the increased popularity of smart phones, tablet computing devices, and other portable computing devices, applications have recently been designed for execution on such types of devices, where the applications are designed to be user-friendly and perform relatively simple tasks. Typically, these applications are available for download from an application repository, where a user can search for and select one or more applications, and cause selected applications to be retrieved from the application repository and installed on the computing device of the user.

Many currently available applications are configured to access content from the Internet by way of a network connection and present such content to a user responsive to the user initiating or interacting with the application. For instance, applications have been developed to provide users with restaurant reviews for restaurants that are relatively proximate to the respective users. Accordingly, the application can take the location of the user as an input, access data by way of the Internet that is relevant to the location of the user, and generate a page that includes the data for presentment to the user.

Further, many applications can generate pages for presentment to a user that include data that is not accessible on the Internet. Such data may be generated by the application developer or retained in a network-accessible repository that is not indexed by a search engine. Currently there are hundreds of thousands of applications that are available in application repositories. Generally, pages generated by these applications are not able to be searched by users; instead, a user must install and execute the application to view such pages. To assist users in ascertaining information about the content of applications, developers of the applications can assign textual metadata thereto that can be retrieved when a search is performed. It is to be understood, however, that content generated by the applications during execution is conventionally not searchable.

SUMMARY

The following is a brief summary of subject matter that is described in greater detail herein. This summary is not intended to be limiting as to the scope of the claims.

Described herein are various technologies pertaining to crawling computer-executable applications such that content (text, images, videos, etc.) of pages generated thereby is searchable. In an exemplary embodiment, an application may have content therein that is static. Static content is content that does not change over different executions of the application, such as different temporal executions of the application or execution of the application from different locations. Static content, in an example, can be extracted from the executable file (binary) of the application. Exemplary static content that can be included in an executable file includes strings, uniform resource locators (URLs) from which the application retrieves data, and the like. Other examples of static content include data retained in a resource file that is accessed by the application during runtime. Such a resource file may include text strings, images, URLs from which the application retrieves content, etc.

Additionally, an application can be configured to generate and display pages that include dynamic content. Dynamic content is content that changes over different executions of the application. In an example, the application can generate a page that includes first dynamic content during a first execution of the application, and the application can generate the page such that the page includes second dynamic content during a second execution of the application. For instance, dynamic content can change over time and/or can change based upon location from which the application is executed.

Technologies described herein pertain to crawling applications that present pages to users that include static content and/or dynamic content, wherein the crawling includes selectively writing content in pages generated by the application during runtime to disk. In connection with retrieving dynamic content included in at least one page generated by the application, the application binary is analyzed to discover type and location of user controls that can be interacted with by a user of the application during runtime thereof, where the user controls may include buttons, sliders, pull-down menus, hyperlinks, selectable lists, etc. Furthermore, for example, a navigation script can be learned or provided by a developer of the application, where the navigation script is an algorithmic traversal through pages of the application. For instance, a navigation script can indicate that a first button is to be selected on a first page, resulting in generation and presentment of a second page, and that a pull-down menu is to be accessed on the second page, and that a particular item in the pull-down menu is to be selected, causing the application to generate a third page, and so on.

The application can be loaded in an emulator, and execution of the application is emulated in the emulator using the locations of the user controls and the navigation script. This causes the application to generate numerous pages in accordance with the navigation script, wherein generation of the pages can include retrieving content from the Internet for inclusion in one or more pages. Each page generated by the application when being executed in the emulator can be written to disk, and a searchable index can be generated based upon the pages written to disk. Thus, content retrieved/generated by the application during runtime can be searched over utilizing a suitable search function. As noted above, the content retrieved/generated by the application can be based upon various parameters, such as location from which the application is emulated to be executing or other user input. Therefore, the application can be executed in the emulator multiple times, with each execution corresponding to a different location.

As can be ascertained, the process of emulating execution of the application may require a relatively large amount of time, particularly if execution of the application is emulated multiple times (for multiple locations) and if the application retrieves content from the Internet. Accordingly, a fast crawl over applications is described herein, wherein a fast crawl over an application comprises executing the application in the emulator utilizing at least one optimization technique, the optimization technique pertaining to crawling the application more quickly when compared to conventional approaches.

For example, when an application or an application update is received from a developer at an application repository where it can be selected, downloaded, and installed by user, the application can be subjected to a full crawl thereover. The full crawl over the application refers to an emulated execution of the application where substantially all pages that can be generated by the application (for substantially all locations from which the application outputs different content) are caused to be generated during the emulated execution. In other words, the full crawl is, as much as possible, an exhaustive emulation of the application. At a later point in time, statistics learned from the full crawl, previous full crawls, and/or previous fast crawls can be employed to perform a fast crawl over the application. The fast crawl utilizes at least one optimization technique to cause the fast crawl to be less time consuming than the full crawl. Pursuant to an example, uniform resource locators (URLs) identified as being pointed to by the application during the full crawl thereover can be retained in a list. A first optimization technique when performing the fast crawl comprises pre-fetching content from these URLs (e.g., in parallel), such that during an emulated execution of the application, the application need not access the content by way of the Internet, but may instead access the content from a local repository, which can significantly reduce an amount of time needed to emulate execution of the application.

Another exemplary optimization technique comprises analyzing pages written to disk from at least one previous crawl (full and/or fast), and identifying which of such pages includes the most unique content relative to other pages generated by the application during the crawl or relative to pages generated by the application over previous crawls. For instance, content of some pages generated by the application may not change very little over different temporal executions of the application. In another example, a first page generated by the application during runtime may have a significant amount of duplicative content relative to a second page generated by the application during runtime. Thus, the optimization technique employed during the fast crawl can include causing the application to generate fewer pages when compared to the number of pages generated by the application during the full crawl, where the pages generated during the fast crawl are selected to provide a largest amount of unique content given a specified time constraint.

Another exemplary optimization that can be employed in connection with the fast crawl over the application is the identification and use of an appropriate location granularity, such that, with respect to an application that generates pages with content that depends on location of a computing device executing the application, execution of the application is emulated using appropriate location granularity. This leads to a reduction in a number of times that execution of the application needs to be emulated during a crawl. In an exemplary embodiment, the application may generate pages with different content at different locations, with a location granularity at the level of a city. Pages written to disk from previous crawls (full and/or fast) can be analyzed to identify the appropriate location granularity, such that, during emulation, the application is not caused to execute multiple times and provide the same content. As with the full crawl, pages retrieved during a fast crawl can be written to disk, such that a searchable index can be updated and content included in pages generated by the application can be searched over.

Other aspects will be appreciated upon reading and understanding the attached figures and description.

DETAILED DESCRIPTION

Figure 1:
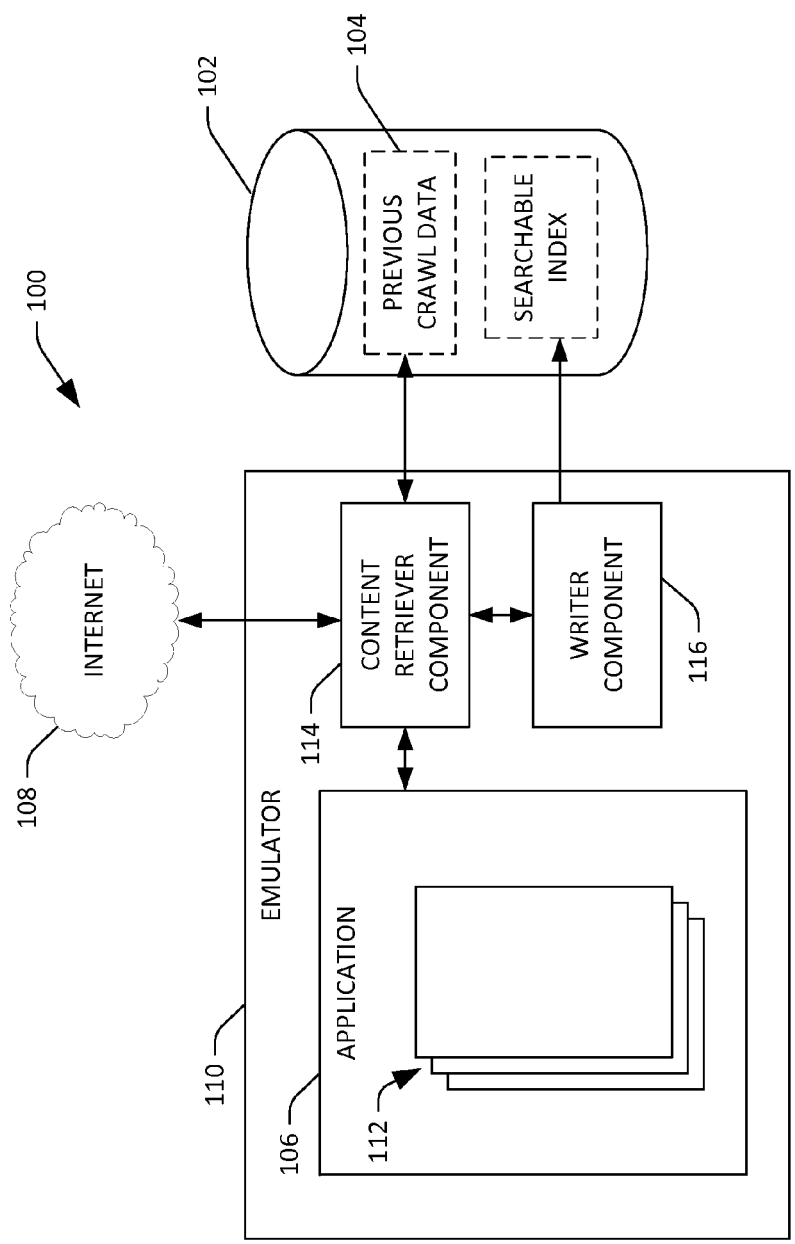
FIG. 1 is a functional block diagram of an exemplary system for crawling a computer executable application to retrieve content included in pages generated by the application during runtime.

Various technologies pertaining to executing crawls over computer-executable applications will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates performing crawls over a computer-executable application is illustrated. The crawls performed can be full crawls or fast crawls, where a full crawl is a more exhaustive (and time-consuming) crawl when compared to a fast crawl. During the full crawl, as much content that can be possibly retrieved by the computer-executable application is caused to be retrieved, without being concerned with time or resource constraints. In contrast, for the fast crawl, the application is selectively caused to output "most important" pages while considering a time or resource constraint. Differences between a full crawl and a fast crawl will be set forth below. The system 100 comprises a data repository 102 that includes previous crawl data 104. The previous crawl data 104 includes content included in pages output by an application 106 when a crawl is performed over the application 106. The application 106 is a computer-executable application that is configured to perform a particular task when executed on a computing device. Generally, the computer-executable application 106, at runtime, is configured to present certain information to a user. The application 106 may be a game, an application for provision of news to the user, an application for provision of restaurant reviews to the user, an application for provision of music/video to the user, etc.

The application 106, when executed on the computing device, is configured to generate pages, wherein content of at least some of the pages may be indiscernible unless the application 106 is executed. Thus, the application 106 may be configured to retrieve content from some network-accessible repository, such as a computing device accessible by way of the Internet 108, and include such content in pages at runtime. In another example, the application 106 can retrieve content customized specifically for the application (which may not be available by way of the Internet 108), such as content generated by a developer or accumulated by the developer. The application 106 can retrieve the content and generate pages upon initialization of the application 106, upon receipt of input from a user of the application 106 (selection of a button, movement of a slider, selection of the menu, selection of an item from a list, etc.), upon a certain event occurring (passage of a certain amount of time, a data source accessed by the application 106 outputting new content, etc.).

Generally, applications such as the application 106 are not subjected to searching by conventional search engines. This is because search engines are not provided with access to pages generated by the applications during runtime. Instead, the applications are "closed", such that pages (and content therein) generated by such applications are retrievable therefrom only if the applications are executed and interacted with. The system 100 is configured to crawl the application 106, wherein crawling the application comprises causing the application 106 to generate pages and write content therein for the purposes of forming and updating an index that is searchable by a search engine.

A full crawl over the application 106 will now be described. During a full crawl over the application 106, both static and dynamic content about the application 106 can be obtained. Static content refers to data about the application 106 that does not change as the application 106 is executed at different times and/or with different input parameters, such as geographic location. Dynamic content refers to data output by the application 106 that can change when the application 106 is executed at different times and/or with different input parameters. In some cases, static data is included in the executable file of the application 106 (the binary), and can comprise text strings included in the binary and/or URLs pointed to by the application 106 during runtime to retrieve content. Additionally, static data may be included in a resource file that is accessed by the application 106 during runtime, wherein such resource file is generally provided with the executable file when the application 106 is downloaded to a computing device from an application repository (or during an update to the application 106). Since static data about the application 106 does not change over time, such static data can be retrieved upon, for example, the application 106 being added to the application repository, where such application 106 can be selected and downloaded by users. The static data may thereafter be retrieved only when an update to the application 106 is made by a developer thereof. This static data can be retained as a portion of the previous crawl data 104 in the data repository 102.

The system 100 may additionally comprise an emulator 110 that is employed in connection with obtaining dynamic data about the application 106. The emulator 110 generally refers to resources of a computing device that are allocated to emulating user interaction with the application 106. In some embodiments, the emulator 110 can additionally be configured to emulate a particular operating environment; for instance, the application 106 may be configured to execute on a mobile telephone, which has a certain operating system. The emulator 110 can be configured to emulate such operating system, thereby providing an environment where user interaction with the application 106 can be emulated. In this example, the application 106 generates a plurality of pages 112 during runtime, wherein the plurality of pages 112 can include content retrieved from the Internet 108 responsive to initialization of the application 106 and/or user interaction with respect to controls set forth in the application 106. Such controls can include buttons, sliders, selectable lists, menus, or other suitable controls. The pages 112 include dynamic data, in that content of the pages 112 can change based upon when the application 106 is executed, where the application 106 is executed, etc. Generally, the emulator 110 is configured to provide an environment and computer-executable code that emulates user interaction with respect to the application 106 to cause the application 106 to generate the pages 112.

In an exemplary embodiment, when the application 106 is provided to an application repository, where such application 106 can be located and downloaded by users, the application 106 can be analyzed and instrumented to cause the application 106 to write pages generated during runtime of the application to the data repository 102. Analysis of the application 106 can include identification of user controls in the application 106 and location thereof. For instance, the application 106 can be analyzed to identify that on a homepage of the application 106 a button exists at certain coordinates. Additionally, the developer of the application 106 can provide a navigation script, which identifies preferred manners in which the application 106 is to be interacted with by end users. Developers often generate navigation scripts for the purposes of testing, and can provide the navigation script to an entity that manages the application repository. The navigation script can identify, for example, that a user will initially be directed towards a homepage of the application 106, and then may select a particular button to go to another page, and then may select a certain button to go to another page, etc. In another example, the navigation script can be automatically learned through analysis of the binary for the application 106. In yet another example, the navigation script can be generated by a third party tester (not the developer) of the application 106.

Once the location of the user controls in the application 106 are identified and the navigation script is received, the emulator 110 can emulate user interaction with the application 106 during runtime in accordance with the navigation script. With more particularity, the emulator 110 can comprise a content retriever component 114 that utilizes the navigation script and learned location of user controls in the application 106 to emulate user interaction with the application 106, thereby causing the application 106 to generate the pages 112 that include content retrieved from a network-accessible repository, such as one available by way of the Internet 108. As the content retriever component 114 causes the plurality of pages 112 to be generated, a writer component 116 can write such pages 112 to the data repository 102. Ideally, the content retriever component 114, during a full crawl, causes the application 106 to exhaustively generate the pages 112, such that the pages 112 include all possible content that can be retrieved by the application 106. Accordingly, in an example where the application 106 generates different pages depending upon a geographic location provided to the application 106, during the full crawl the content retriever component 114 can execute the navigation script over the application 106 several times (using different geographic location values). For instance, the application 106 may be configured to provide coupons for retail establishments across different locations. Therefore, the content retriever component 114 can cause the application 106 to generate pages for numerous different locations (e.g., each city in a particular geographic region). As pages are generated by the content retriever component 114, the writer component 116 writes the pages to the data repository 102. Content of the pages can be retained in the data repository 102 as a portion of the previous crawl data 104.

Additionally, the static data and the dynamic data retrieved during the full crawl of the application 106 may be employed to generate/update a searchable index 118. The searchable index 118 is shown as being included in the data repository 102; it is to be understood, however, that the searchable index 118 can be retained in a different data repository from the previous crawl data 104 or spread across numerous repositories. Accordingly, if a user subsequently sets forth a query to search over contents of the application 106, the searchable index 118 can be searched over based upon the query, and search results can be retrieved and provided to the user.

It can be ascertained that executing a full crawl over the application 106 can take a relatively large amount of time, as the application 106 may access several URLs to retrieve content, and may generate different pages depending upon an input parameter, such as geographic location. For instance, retrieving pages from the Internet 108 can be a relatively large time sync, in that in some cases it may take several seconds for the application 106 to access a URL and retrieve content therefrom to generate one or more of the pages 112. During the full crawl, however, the application is caused to generate as many different pages as possible, without regard to time or computing resources.

To reduce an amount of time when crawling the application 106 and/or to cause most valuable content to be generated by the application in a given time limit, a fast crawl can be undertaken, which is undertaken in less time (when using the same computing resources to perform the fast crawl) when compared to time needed to execute the full crawl and/or is completed in the given time limit.

The fast crawl over the application 106 can be based upon the previous crawl data 104. As noted above, the previous crawl data 104 includes content retrieved from a previously-executed full crawl over the application 106 (and optionally data retrieved during a previously-executed fast crawls over the application 106). During execution of the fast crawl, the content retriever component 114 causes the application 106 to retrieve less content from the Internet 108 when outputting the plurality of pages 112 when compared to the content retrieved from the Internet 108 during the full crawl of the application 106. There are a variety of optimizations that can be undertaken by the content retriever component 114 when undertaking a fast crawl over the application 106.

In a first optimization, the content retriever component 114 can identify which of the pages 112 generated by the application 106 include the most "new" content relative to an amount of time needed to generate such pages. The term "new content" can refer to content that is new relative to other content retrieved during a single crawl (e.g., a first page output by the application 106 may include content that is substantially similar to a second page that is output by the application 106 during a single execution of the application 106). Additionally, "new content" can refer to content that is new over different temporal executions of the application 106 or different locations provided as input to the application 106. For example, during a first execution of the application 106 at a first point in time, a page can be generated that includes first content retrieved from the Internet 108. During a subsequent crawl of the application 106 (at a later point in time), the page can be generated that includes the same or similar content. Therefore, during the fast crawl, the content retriever component 114 need not cause such page to be generated by the application 106, as it is likely that the page includes content that is substantially similar to content previously written to disk from a previous crawl. In another example, the page generated by the application 106 may include substantially different content from different temporal executions of the application 106. In such case, then, it may be desirable for the content retriever component 114 to cause the page to be output by the application 106 during the fast crawl. Therefore, the first optimization relates to identifying a subset of pages that can be generated by the application 106 that include a substantial amount of new content, and causing such subset of pages to be generated by the application 106 during the fast crawl (while not causing other pages that can be generated by the application 106 to be output). With more particularity, the content retriever component 114 can cause the application 106 to output the subset of pages by choosing and visiting a relatively small portion of the application rather than visiting the application 106 exhaustively (e.g., causing the application 106 to generate a lesser number of pages than the application 106 is capable of generating). Additionally, the content retriever component 114 can cause the application 106 to output the subset of pages by executing the application with a relatively small number of location inputs (if the application is location-aware) instead of all possible location inputs.

In an exemplary embodiment, a dynamic programming based algorithm can be employed to identify which of the pages 112 are to be generated by the application 106 during the fast crawl. Identifying pages generated by the application 106 that include the most "new content" can be particularly useful when setting forth at time limit within which the fast crawl must be completed.

A second exemplary optimization that can be employed in connection with performing a fast crawl comprises pre-fetching of content from the Internet 108, such that when the emulator 110 emulates execution of the application 106, content at URLs accessed by the application 106 at runtime is already available in local storage. The content retriever component 114 can access the previous crawl data 104 and identify URLs pointed to by the application 106 during runtime (as identified in the previous crawl data 104). The content retriever component 114 can pre-fetch content at such URLs in parallel, such that when the application 106 is loaded into the emulator 110, the application 106 need not access the Internet 108 to retrieve content at the URLs, but can instead access the content directly from local storage. The content retriever component 114 can also identify patterns in URLs in the previous crawl data 104 to pre-fetch content from appropriate URLs. In an example, when different locations are provided to the application 106, respective URLs pointed to by the application 106 may slightly change. Over time, the manner in which URLs change can be identified, thereby facilitating retrieval of content at an appropriate URL when the application 106 is subjected to a fast crawl.

A third optimization that can be undertaken during a fast crawl over the application comprises automatically identifying a granularity of location to provide to the application 106 during the fast crawl. In an example, the application 106 may be an application that outputs current sales for goods or services in respective geographic regions, such that provision of different locations to the application 106 results in different sales being output by the application 106. To cause the application 106 to output all possible sales, different locations must be provided to the application 106 (e.g., different cities). The content retriever component 114 can analyze the previous crawl data 104 to ascertain an appropriate location granularity to use when providing locations to the application 106 during the fast crawl. For instance, the application 106 may output different sales if the location is changed by a city; accordingly, changing the location provided to the application 106 by a city block does not result in new data being included in pages output by the application 106. A desired location granularity can be identified by determining a smallest granularity that causes the application to output different content. In another example, the desired location granularity can be selected to optimize a tradeoff between new data generated by the application and a time constraint for the fast crawl. By identifying an appropriate location granularity, a number of times that the application 106 is executed in the emulator 110 can be reduced (when compared to the number of times that the application 106 is executed during an initial full crawl), thereby decreasing time needed to crawl the application 106.

Figure 2:
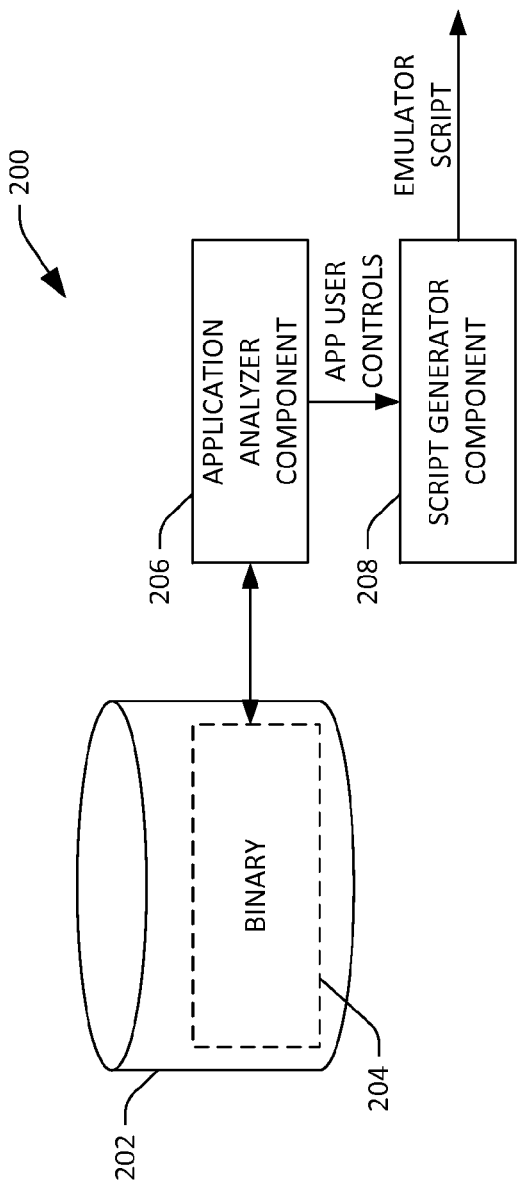
FIG. 2 is a functional block diagram of an exemplary system that facilitates generating a navigation script used when emulating execution of an application.

Turning now to FIG. 2, an exemplary system 200 that facilitates learning a navigation script that can be employed by the content retriever component 114 when the application 106 is crawled over in the emulator 110 is illustrated. The system 200 comprises a data repository 202 that includes a binary 204 for the application 106. The system 200 further includes an application analyzer component 206 that analyzes the binary 204 to identify existence and location of controls that will be presented to users during runtime of the application 106. As noted above, such controls can include buttons, sliders, pull-down menus, selectable lists, hyperlinks, etc.

The system 200 may also comprise a script generator component 208 that outputs a navigation script for the application 106. The script generator component 208 can receive the location of the user controls from the application analyzer component 206 and may select each possible control during an emulated execution of the application 106, thus generating the navigation script. The navigation script may subsequently be employed during full crawls or fast crawls over the application 106. In another embodiment, a third party tester (a person or entity other than the developer) can manually execute the application 106, and the script generator component 208 can record user interaction with the application 106. Such recording can be employed as the navigation script, which may then be employed during emulated execution of the application 106. In still another example, rather than the script generator component 208 generating the navigation script, such script can be provided by a developer of the application 106.

Figure 3:
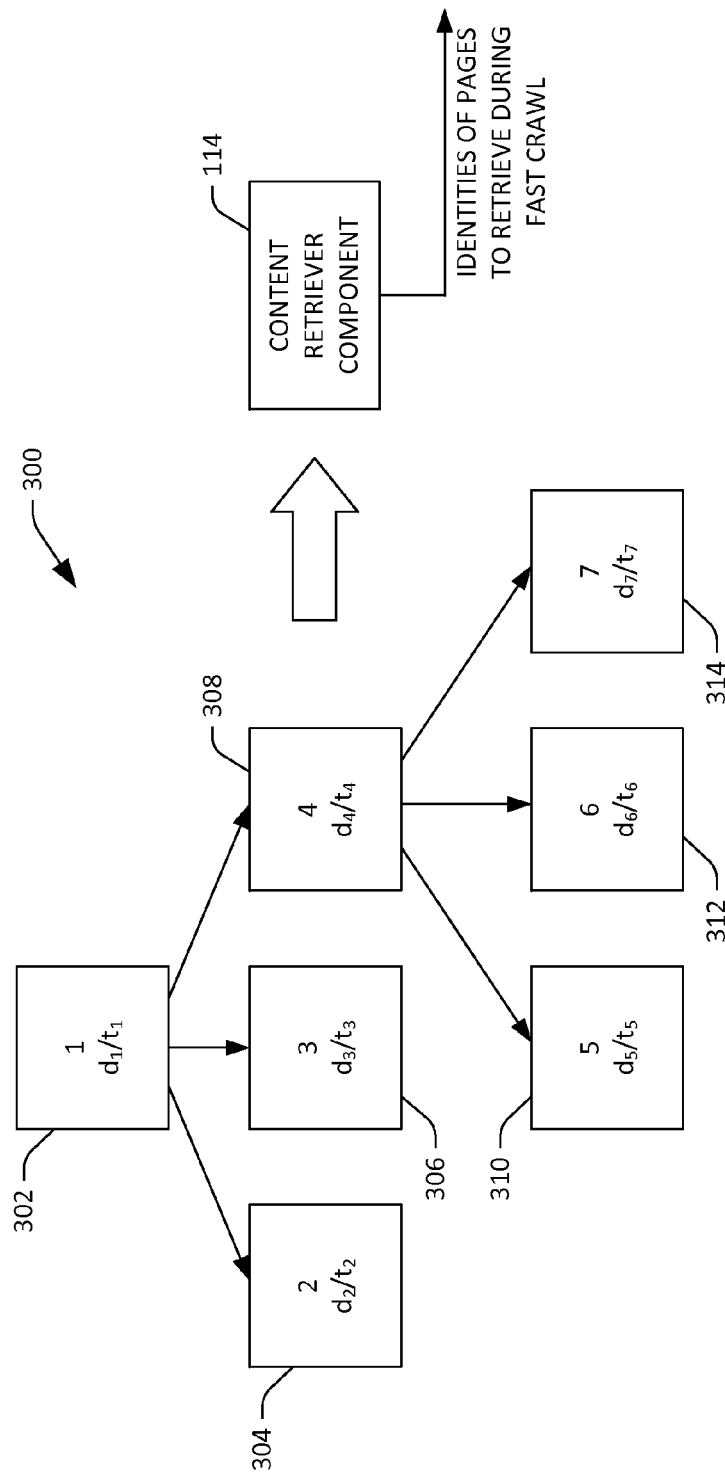
FIG. 3 is an exemplary diagram that illustrates pages generated by an application during runtime that can be retrieved when performing a crawl over the application.

Now referring to FIG. 3, a depiction 300 of exemplary pages 302-314, in the form of a tree structure, that can be generated by the application 106 is illustrated. The depiction 300 illustrates that seven separate pages 302-314 can be generated by the application 106 at runtime when interacted with by a user. For example, the first page 302 is output by the application 106 when the application 106 is initiated by the user. The first page includes data $d_1$ with a time $t_1$ required to generate the first page 302. A control on the first page 302, when selected by the user, may cause the second page 304 to be output by the application 106, wherein the second page 304 includes data $d_2$. The second page 304 is output by the application 106 in time $t_2$. Once provided with the second page 304, the user can return to the first page 302 or exit the application 106.

In another example, when viewing the first page 302, the user may select a second user control and be provided with the third page 306. The third page 306 includes data $d_3$, and requires time $t_3$ to be output by the application 106 (where $t_3$ includes the time $t_1$ to output the first page 302).

Similarly, the first page 302 may have a third user control that, when selected by the user, causes the application 106 to output the fourth page 308. The fourth page 308 includes content $d_4$ that may be different from the content $d_1$ of the first page 302, the content $d_2$ of the second page 304, and the content $d_3$ of the third page 306, although there may be some overlap in content.

The fourth page 308 can include a plurality of user controls (e.g., three), wherein selection of the controls causes other pages 310-314 to be respectively output by the application 106. For instance, if a user selects a first user control in the fourth page 308, the application 106 outputs the fifth page 310, wherein the fifth page includes content $d_5$, and wherein the fifth page 310 is output in time $t_5$ (which includes times $t_1$ and $t_4$). If the user selects a second user control in the fourth page 308, the application 106 outputs the sixth page 312, which includes data $d_6$, and wherein the sixth page 312 is output in time $t_6$ (which includes times $t_1$ and $t_4$). If the user selects a third user control in the fourth page 308, the application 106 outputs the seventh page 314, which includes data $d_7$, and wherein the seventh page 314 is output in time $t_7$ (which includes times $t_1$ and $t_4$).

The previous crawl data 104 in the data repository 102 can indicate how much new data is included in each of the pages 302-314, as well as an amount of time needed for the application 106 to output such pages. The content retriever component 114, in an exemplary embodiment, can perform an optimization to identify which of the pages 302-314 to cause to be output by the application 106 during the fast crawl, wherein the subset of pages identified by the content retriever component 114 can result in obtainment of the most new data in a specified time constraint. For example, the content retriever component 114 can be provided with a constraint that the content retriever component 114 has 30 seconds to obtain as much data as possible about the application 106 during the fast crawl. Through analysis of the previous crawl data 104, identity of a subset of the pages 302-314 can be determined, wherein the subset of pages results in obtainment of a maximum amount of new data that can be output by the application 106 in the time constraint.

A challenge when performing such optimization, for instance, is that the content retriever component 114 cannot cause the application 106 to jump directly to a particular page. For instance, to cause the application 106 to output the seventh page 314, the application 106 must first output the first page 302, and then output the fourth page 308, and thereafter output the seventh page 314. Thus, the content retriever component 114 can have knowledge of a navigation tree of the application 106, and can select a sub-tree of such navigation tree that provides the most new data in the constrained amount of time. During a fast crawl, then, the content retriever component 114 may cause the application 106 to output pages in the sub-tree.

Figure 4:
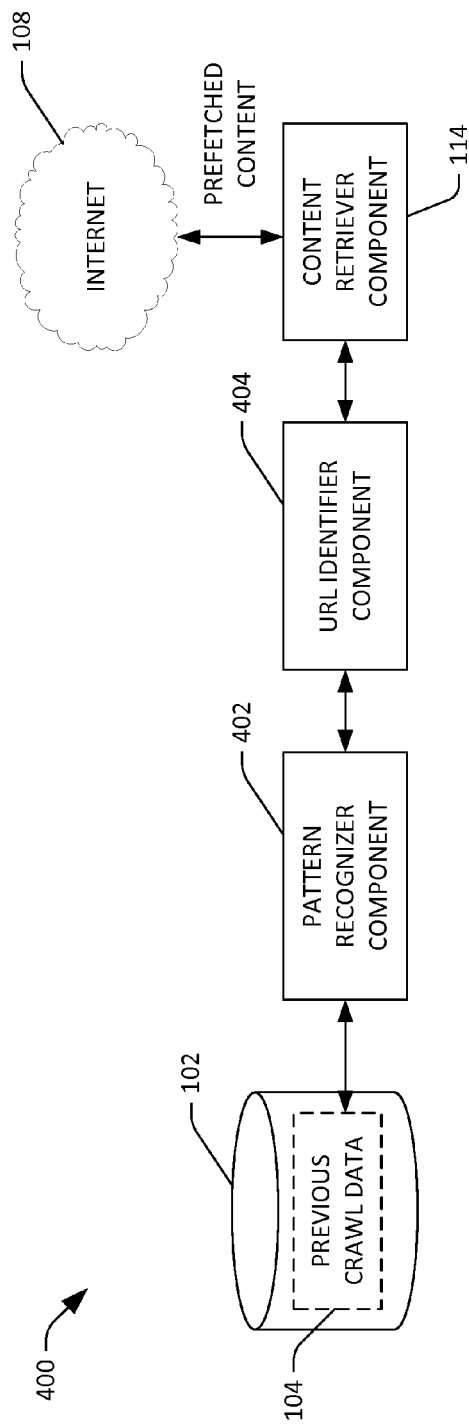
FIG. 4 is a functional block diagram of an exemplary system that facilitates identifying uniform resource locators (URLs) accessed by an application during runtime.

With reference now to FIG. 4, an exemplary system 400 that facilitates identifying URLs from which content is pre-fetched (for utilization when executing a fast crawl over the application 106) is illustrated. The system 400 includes the data repository 102, which comprises the previous crawl data 104. The previous crawl data 104 includes identifications of URLs that were accessed by the application 106 during at least one previous crawl. The system 400 further comprises the content retriever component 114, which can receive the URLs and access the Internet 108 to fetch content at the URLs prior to the application 106 being executed in the emulator 110. During emulation, then, content from the URLs that has been pre-fetched can be quickly retrieved from a local repository by the content retriever component 114, rather than the content retriever component 114 having to access the Internet 108 to obtain such content when the application 106 is executing in the emulator 110.

In an exemplary embodiment, for each page that can be output by the application 106, a list of URLs from which content is to retrieved by the application 106 to generate a respective page can be maintained. A challenge, however, is that when the application 106 goes from one execution to the next, a URL may not be identical (there may be some slight change). Thus, the application 106, when outputting the same page at different times or locations, may be retrieving content from different URLs. Oftentimes, however, URLs retrieved by the application 106 at different times and/or when the application 106 is emulated as being executed at different locations can be somewhat similar. For instance, only a particular parameter in the URL may change, wherein such parameter pertains to the location at which the application 106 is executed.

The system 400 can comprise a pattern recognizer component 402 that analyzes the previous crawl data 104 to identify patterns in URLs accessed by the application 106 during different crawls. For instance, the pattern may be a relatively slight change in the URL that is based upon the location provided to the application 106. A URL identifier component 404 can provide a URL to be fetched by the content retriever component 114 based at least in part upon a pattern recognized by the pattern recognizer component 402. In an example, the pattern recognizer component 402 can analyze the previous crawl data 104 to ascertain that, for a particular page output by the application 106 at different locations, a certain portion of a URL changes (e.g. the portion of the URL changes from "Seattle" when the application 106 is provided with the location of Seattle to "Chicago" when the application 106 is provided with the location of Chicago).

The pattern recognizer component 402 can recognize that this portion of the URL changes with location, and the URL identifier component 404 can receive such pattern and can identify URLs to be fetched by the content retriever component 114 based upon such pattern. For instance, the URL identifier component 404 can automatically modify the URL in the previous crawl data 104 to include data corresponding to the pattern recognized by the pattern recognizer component 402 (may change the portion of the URL to "Atlanta").

Figure 5:
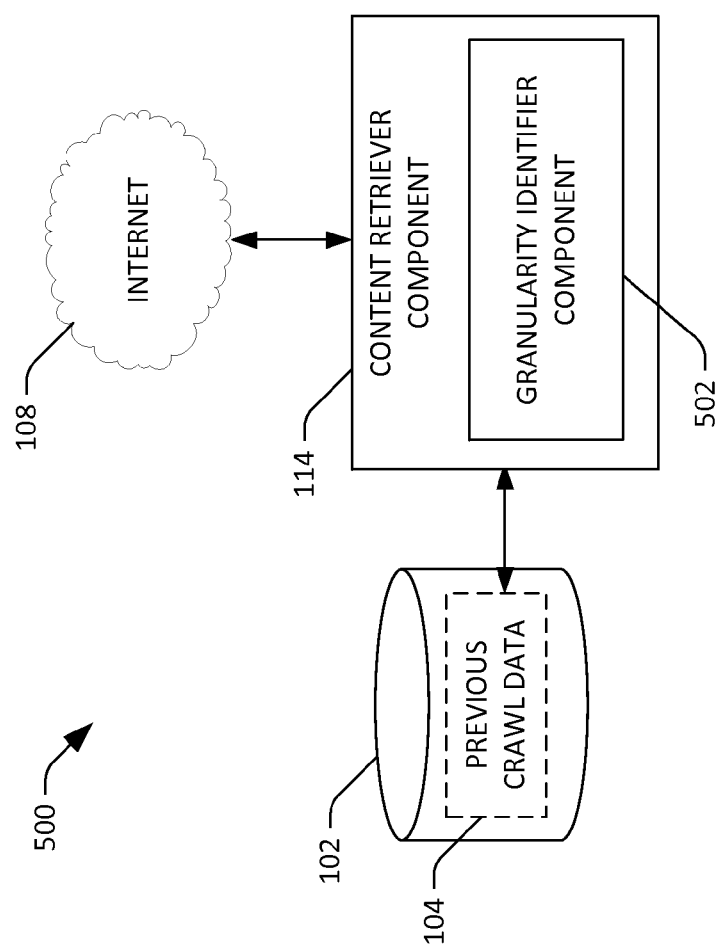
FIG. 5 is a functional block diagram of an exemplary system that facilitates determining an appropriate location granularity to employ when emulating execution of the application for a fast crawl.

Turning now to FIG. 5, an exemplary system 500 that facilitates ascertaining a granularity of location to provide to the application 106 when a fast crawl is executed over the application 106 is illustrated. The system 500 includes the data repository 102, which comprises the previous crawl data 104. The previous crawl data 104 can include content from pages output by the application 106 during previous crawls over the application 106 as well as corresponding locations provided as input to the application 106 during such crawls. The content retriever component 114 can analyze the previous crawl data 104 to identify an appropriate granularity of location to provide to application 106 during the fast crawl. The content retriever component 114 can include a granularity identifier component 502 that causes the application 106 to be executed with many different locations as input, wherein the locations have varying granularities. Different location-based applications may provide data using different location granularities. For example, if the application 106 is configured to output identities of restaurants, a change in location of a few hundred feet may result in different content being output by the application 106. If the application 106 is directed towards coupons, however, and the location provided the application 106 is changed by a few hundred feet or a few kilometers, the output of the application 106 may be identical. In other words, the application 106, in such example, will provide new content only if location is changed at least at a city level.

The granularity identifier component 502 then can review outputs of several emulations of execution of the application 106 (at different locations/location granularities) and identify if the content of pages changes during the different emulations. For a relatively small granularity (e.g., location changes on the order of several hundred feet), if the output does not change using different input locations, the granularity identifier component 502 can provide location data at a larger granularity (e.g., a mile) to the application 106. Over time, the granularity identifier component 502 can determine an appropriate location granularity to use when performing a fast crawl over the application 106.

In practice, from time to time, the content retriever component 114 can execute a full crawl over the application 106 to ensure that operation of the application 106 is not changing, as well as to update statistics about the application 106. Typically, however, fast crawls can be executed, such that a relatively large amount of content output by the application 106 can be obtained and placed in the searchable index 118 while performing such crawls in a smaller amount of time relative to the full crawl and/or within given time/resource constraints.

Figure 6:
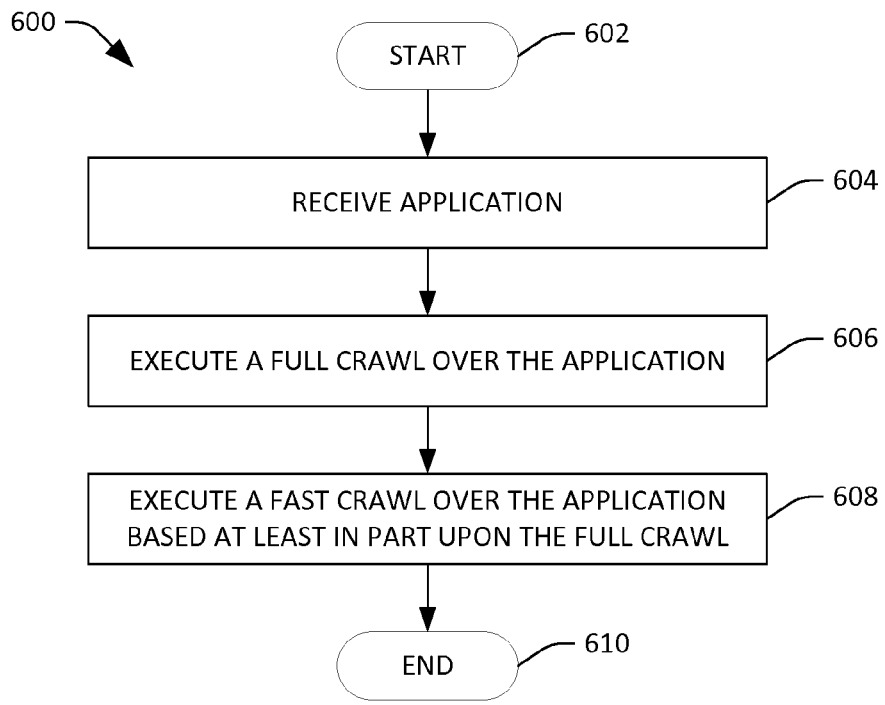
FIG. 6 is a flow diagram that illustrates an exemplary methodology for executing a fast crawl over an application based at least in part upon content retrieved during a full crawl over the application.
Figure 7:
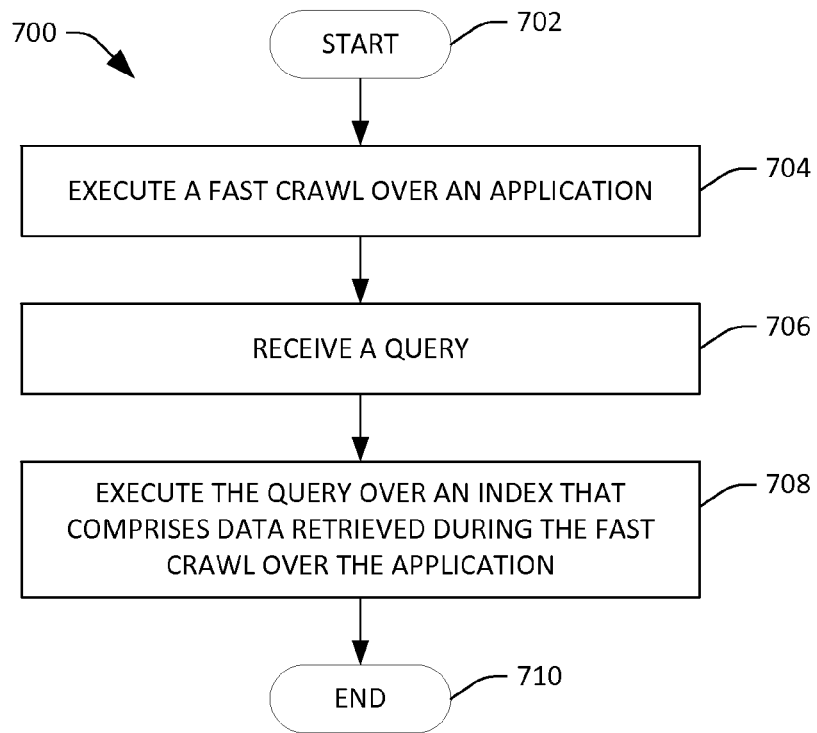
FIG. 7 is a flow diagram that illustrates an exemplary methodology for executing a query over an index that comprises data retrieved during a fast crawl over an application.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable storage medium or media. The computer-executable instructions may include a routine, a sub-routine, programs, a thread of execution, and/or the like. Still further, results of acts of the methodologies may be stored in a computer-readable storage medium, displayed on a display device, and/or the like.

Now referring to FIG. 6, an exemplary methodology 600 that facilitates executing a fast crawl over an application is illustrated. The methodology 600 starts at 602, and at 604 an application is received. As described above, the application received at 604 is configured for installment on an end-user computing device, wherein the application, when executed by a user on such device, outputs a plurality of pages that include content retrieved by way of the Internet responsive to receipt of respective user input.

At 606, a full crawl is executed over the application. As described above, execution of the full crawl includes executing the application in an emulator and causing the application to output the plurality of pages. During the full crawl, for example, different input parameters can be provided and the application can be executed in the emulator multiple times, once for each different input parameter. Each page output by the application may then be stored to a data repository and can be used to generate/update a searchable index.

At 608, subsequent to the full crawl being executed over the application, a fast crawl is executed over the application based at least in part, upon the full crawl. Specifically, output of the full crawl can be employed to update statistics about the execution of the application, including what new data is included in pages output by the application, identities of URLs that are accessed, amounts of time needed by the application to output pages, etc. By analyzing these statistics, the fast crawl can be executed more quickly than the full crawl (when using the same computing resources). For instance, during the fast crawl, a page that includes substantially similar content to another page may not be caused to be output by the application when the application is executing in the emulator. Further, content from URLs can be pre-fetched, such that when the application is executing in the emulator, the application need not access the URLs by way of the Internet, but may instead retrieve content from a local repository (e.g., content retrieved from URLs content can be cached). In another example, when executing in the emulator, the application 106 can be provided with location input at appropriate granularities such that the application 106 is not executed more than necessary in the emulator. The methodology 600 completes at 610.

With reference now to FIG. 7, an exemplary methodology 700 that facilitates outputting a search result that includes data obtained during a fast crawl over an application is illustrated. The methodology 700 starts at 702, and at 704 a fast crawl is executed over the application. Execution of the fast crawl results in writing of pages output by the application when executed in an emulator to disk and generating a searchable index based upon these pages written to disc. At 706, a query is received, wherein the query may be received at a web-based search engine (e.g., accessed by a user through utilization of a browser). In another example, the query can be received at a desktop search engine that is configured to search over content of a machine of a user. In still yet another example, the query can be received at a search engine that is configured to search content of applications in an application repository, wherein users can select applications for downloading and installing on their respective client devices.

At 708, the query is executed over a searchable index that comprises data obtained during the fast crawl over the application. Accordingly, the search result includes data from a page output during the fast crawl. The methodology 700 completes at 710.

Figure 8:
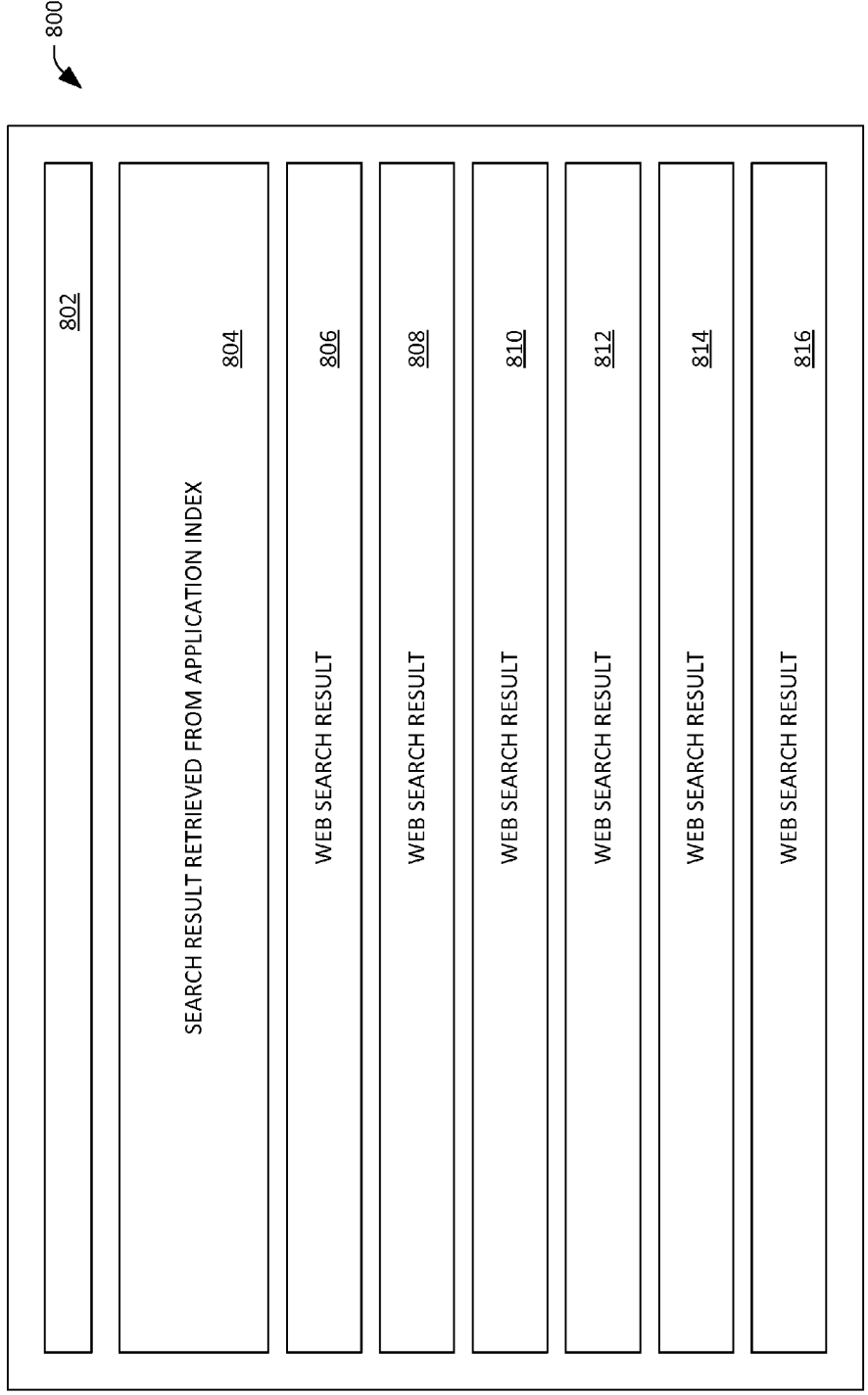
FIG. 8 illustrates an exemplary graphical user interface that includes a search result comprising data retrieved during a crawl over an application.

With reference now to FIG. 8, an exemplary graphical user interface 800 is illustrated. The graphical user interface 800 may be a graphical user interface for a general purpose search engine that can be initiated through utilization of a web browser, through utilization of a search application installed on a computing device, or the like. The graphical user interface 800 includes a query field 802 that is configured to receive a user query. The user can place a cursor in the query field 802 and enter a textual query therein. In other embodiments, the user can provide a query to the search engine through a voice command. In the example shown here, the user sets forth a query and is provided with a plurality of search results 804-816. The search results 806-816 may be conventional web search results. The search result 804, however, is a search result that comprises data retrieved from an application during a full crawl or fast crawl. The search result 804 can be highlighted in some manner to indicate to the end-user that the search result includes data outputtable by a computer-executable application.

Selection of the search result 804 may direct the user to a web page that includes a screenshot of the page output by the application that includes data relevant to the query issued by the user. In another example, selection of the search result 804 may direct the user to a location where the application can be downloaded for installment on her computing device. If the application already exists on the computing device of the user, selection of the search result 804 may cause the application to be initiated on the computing device of the user.

Figure 9:
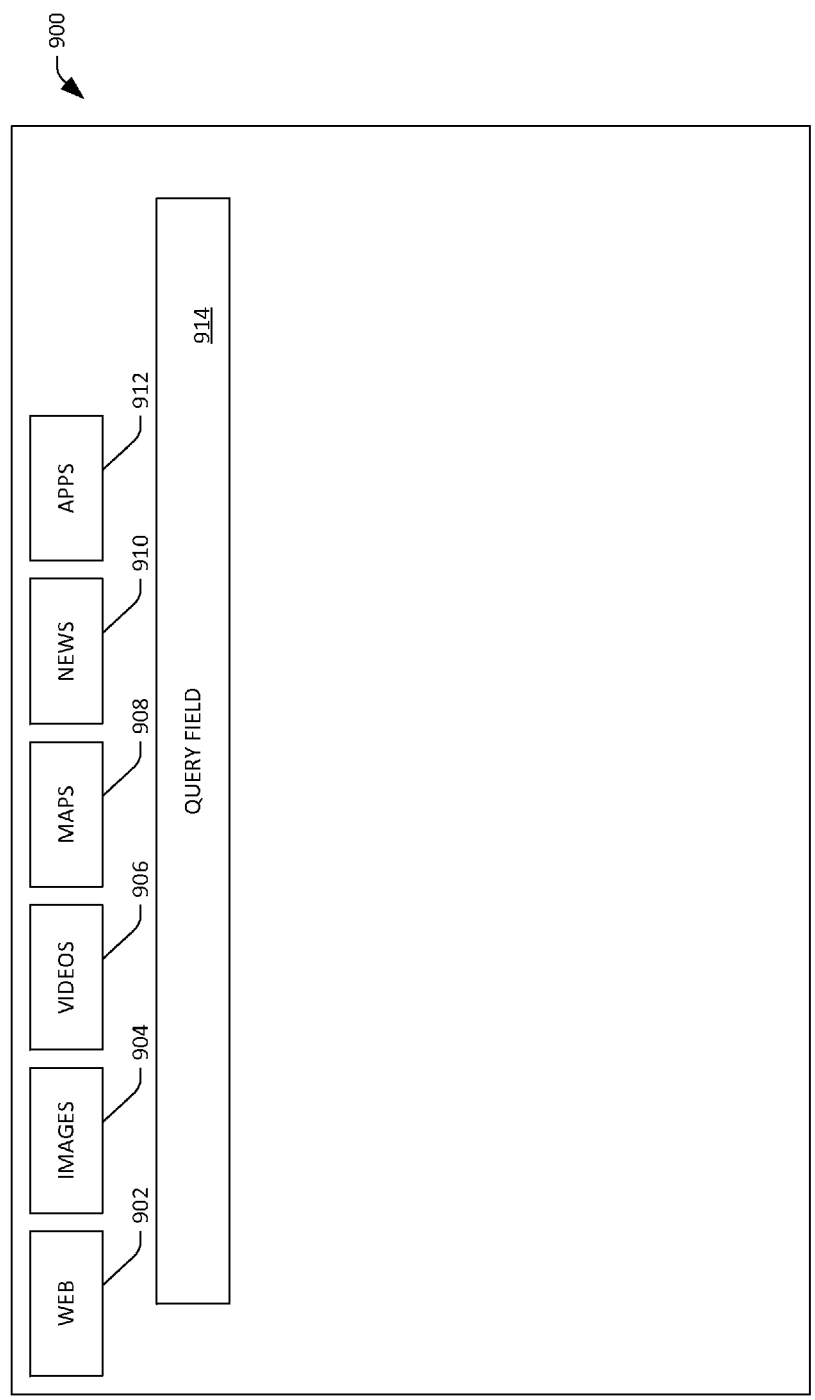
FIG. 9 illustrates an exemplary graphical user interface corresponding to a search engine, the graphical user interface comprising a selectable vertical for searching application content.

With reference now to FIG. 9, another exemplary graphical user interface 900 of a search engine page is illustrated. Conventional search engines include numerous verticals that can be selected by users. When a user selects a vertical, a subsequent query provided by the user is executed only over such vertical. For instance, if the user wishes to obtain images about a particular celebrity, the user can select an "images" vertical, provide a query that includes the name of the celebrity to the search engine, and the search engine will provide images to the user. In the exemplary graphical user interface 900, the search engine includes six verticals: a "web" vertical 902, an "images" vertical 904, a "videos" vertical 906, a "maps" vertical 908, a "news" vertical 910, and an "apps" vertical 912, although a search engine may include more, fewer, or different verticals. The graphical user interface 900 additionally includes a query field 914. In an example, the user can initially select the "apps" vertical 912. Subsequently, the user can set forth a query in the query field 914, which causes the search engine to execute the query over the searchable index 118, which is based upon pages written to disk from a full and/or fast crawl. Thus, in this example, search results returned to the user do not include conventional search results retrieved from the Internet, but would be based upon content retrieved during the full crawl and/or fast crawl.

Figure 10:
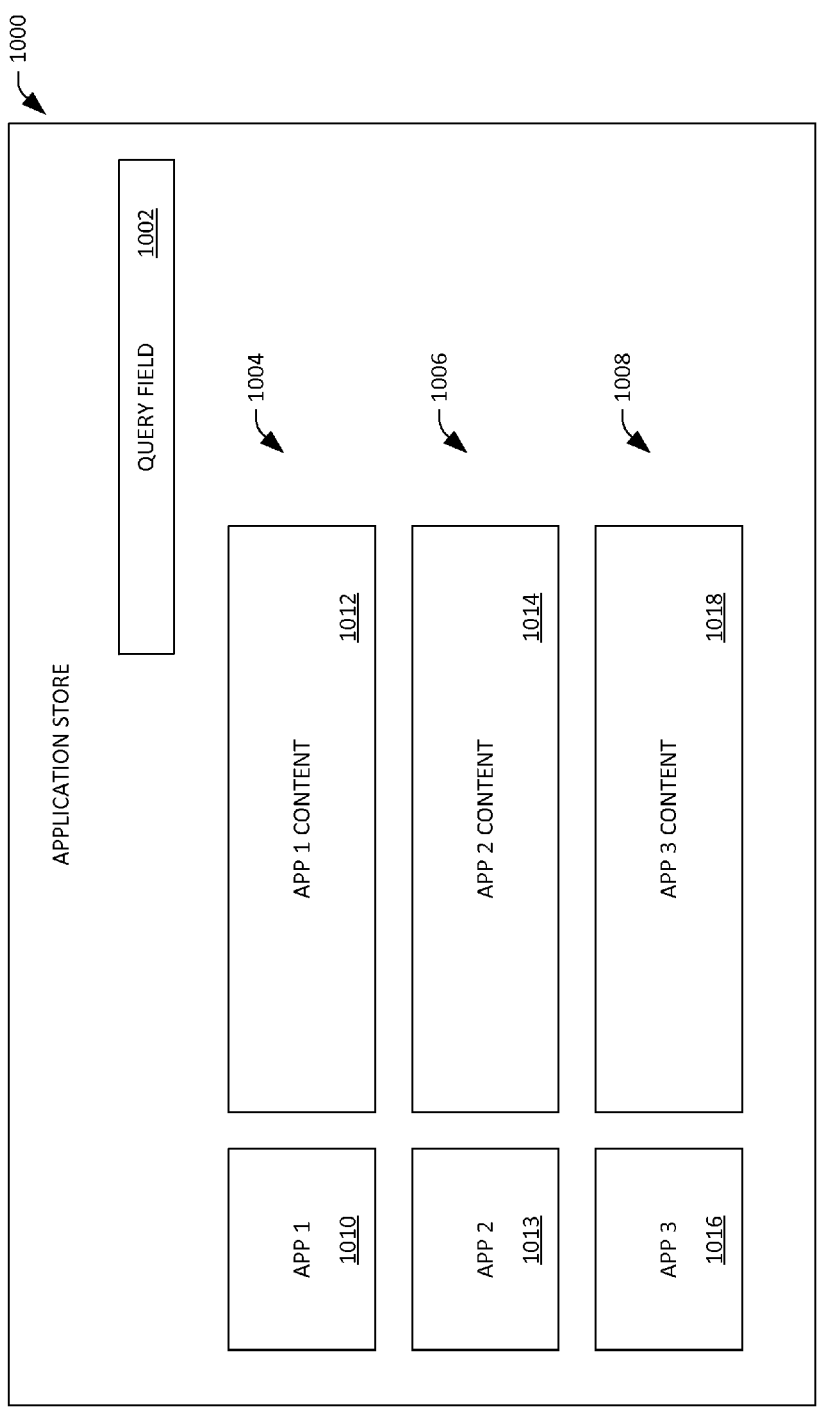
FIG. 10 is an exemplary graphical user interface for searching content of applications available in an application repository.

Now referring to FIG. 10, another exemplary graphical user interface 1000 is illustrated. The graphical user interface 1000 corresponds to an application repository, where a user directs a computing device to a network-accessible location, where the user can select, potentially pay for, and download applications for installment on the computing device. In the exemplary graphical user interface 1000, a query field 1002 can be included, where the user can set forth a query that is to be executed over content of applications in the application repository. In the graphical user interface 1000, the user has issued a query to the query field causing a plurality of search results 1004-1008 to be retrieved. In an example, the search result 1004 can include a graphical object 1010 that is representative of a first application. The search result 1004 may also include content from the first application that is relevant to the query set forth by the user in the query field 1002. For instance, the content 1012 may be a screenshot of a page output by the application represented by the graphical object 1010. The graphical object 1010 may be a selectable graphical object that causes, for example, the application to be downloaded and installed on a computing device of the user. In another example, if the application is already installed on the computing device of the user, selection of the graphical object 1010 can cause the application to be initiated on the computing device of the user.

The second search result 1006 includes a second graphical object 1013 corresponding to a second application and second content 1014 that is relevant to the query set forth in the query field 1002. The third search result 1008 includes a third graphical object 1016 corresponding to a third application and third content from the third application that is relevant to the query set forth in the query field 1002.

The graphical user interface 1000, in another embodiment, may correspond to applications installed on the computing device of the user. Therefore, rather than the query set forth in the query field 1002 being executed over all applications in an application repository, the query set forth in the query field 1002 may be executed only over applications installed on the computing device of the user (or applications selected by the user).

Figure 11:
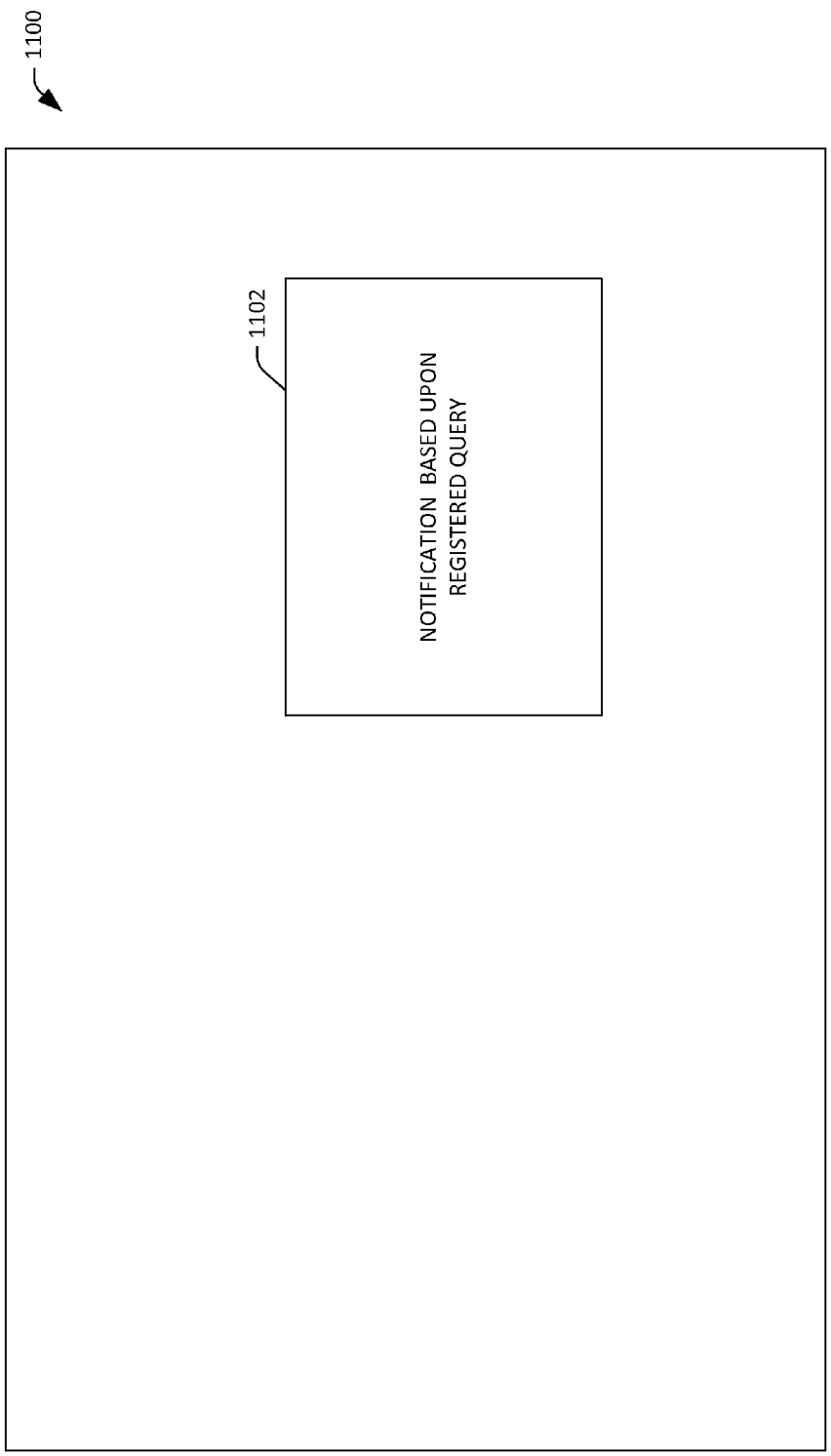
FIG. 11 is an exemplary graphical user interface that includes a notification provided to a user based upon content of an application retrieved during a crawl thereover.

Now referring to FIG. 11, an exemplary graphical user interface 1100 is illustrated. For example, a user may register a query, such that the query is executed over applications in an application repository or applications installed on a computing device of a user. For instance, the user may be interested in a vacation to Hawaii, and may register a query "deals on trips to Hawaii". This query can be executed periodically or from time to time, and a notification 1102 can be presented to the user if a search result that is relevant to the query is located. Continuing with the example set forth above, if an application outputs a page that includes information about a sale on plane tickets to Hawaii, the notification 1102 can be presented on the display screen of a computing device of the user informing such user of the content output by the application.

Figure 12:
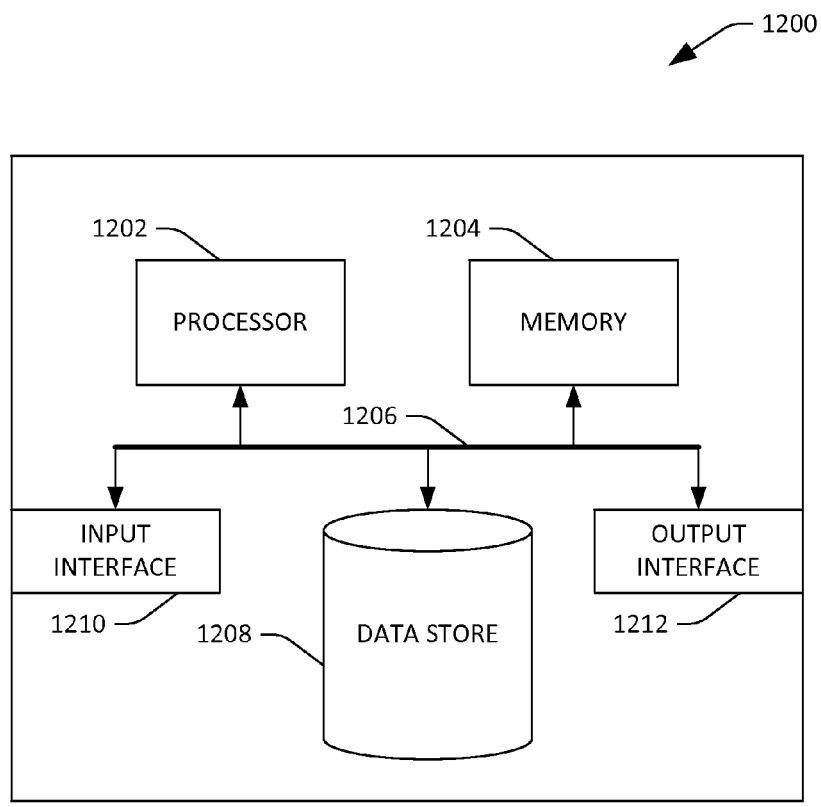
FIG. 12 is an exemplary computing system.

Now referring to FIG. 12, a high-level illustration of an exemplary computing device 1200 that can be used in accordance with the systems and methodologies disclosed herein is illustrated. For instance, the computing device 1200 may be used in a system that supports executing a full crawl and/or a fast crawl over an application. In another example, at least a portion of the computing device 1200 may be used in a system that supports searching over an index that comprises data retrieved during a full crawl and/or fast crawl over an application. The computing device 1200 includes at least one processor 1202 that executes instructions that are stored in a memory 1204. The memory 1204 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store a navigation script, identities and locations of user controls of an application, etc.

The computing device 1200 additionally includes a data store 1208 that is accessible by the processor 1202 by way of the system bus 1206. The data store 1208 may be or include any suitable computer-readable storage device, including a hard disk, memory, etc. The data store 1208 may include executable instructions, content retrieved from executing a full crawl and/or fast crawl over an application, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for executing a fast crawl over an application, the method comprising:
   receiving the application, the application configured for installment on a computing device, wherein the application, when executing on the computing device, generates a plurality of pages responsive to receipt of respective user input, wherein the plurality of pages comprise data retrieved from the Internet;
   executing a full crawl over the application, wherein executing the full crawl comprises:
      executing the application in an emulator, wherein executing the application in the emulator comprises retrieving the data from the Internet; and
      writing the plurality of pages to a computer-readable data store; and executing the fast crawl over the application subsequent to the executing of the full crawl over the application, wherein executing the fast crawl comprises:
  executing the application in the emulator; and
  employing at least one optimization technique to cause the fast crawl to be completed in less time than the full crawl, or within a given time limit, wherein the at least one optimization technique is based at least in part upon the plurality of pages written to the computer-readable data store from the full crawl over the application.

2. The method of claim 1, further comprising:
  receiving a navigation script that, when executed over the application in the emulator, causes the application to generate the plurality of pages; and
  executing the navigation script during the full crawl over the application.

3. The method of claim 1, wherein during the full crawl, a first uniform resource locator from which the application retrieves data is identified, and wherein the at least one optimization technique comprises retrieving data from the first uniform resource locator prior to the executing of the application in the emulator during the fast crawl.

4. The method of claim 3, further comprising:
  identifying a pattern between uniform resource locators accessed by the application during previous crawls based at least in part upon the first uniform resource locator and a second uniform resource locator, wherein the second uniform resource locator was accessed by the application during a crawl undertaken subsequent to the full crawl; and
  retrieving data from a third uniform resource locator prior to the executing of the application in the emulator during the fast crawl, wherein the third uniform resource locator is identified using the pattern between uniform resource locators accessed by the application during previous crawls.

5. The method of claim 4, wherein the pattern is based upon differences between the first uniform resource locator and the second uniform resource locator.

6. The method of claim 5, wherein the differences between the first uniform resource locator and the second uniform resource locator are based upon geographic location data provided to the application as input.

7. The method of claim 1, wherein the at least one optimization technique is based upon data learned during a previous fast crawl over the application.

8. The method 1, wherein that data retrieved from the Internet by the application is based upon a geographic location provided to the application as input.

9. The method of claim 8, wherein the at least one optimization technique comprises identifying a granularity of the geographic location to provide to the application when executing the fast crawl, wherein the granularity of the geographic location is identified by providing various location granularities to the application and selecting a smallest granularity for which application behavior alters.

10. The method of claim 1, wherein executing the fast crawl comprises causing the application to output a subset of pages from the plurality of pages output during the full crawl, wherein the subset of pages includes fewer pages than the plurality of pages, and wherein the subset of pages are identified based at least in part upon the time limit.

11. The method of claim 10, further comprising identifying the subset of pages based at least in part upon content in the subset of pages relative to content in other pages not included in the subset of pages.

12. The method of claim 10, further comprising identifying the subset of pages utilizing a dynamic programming based algorithm.

13. A method executed by a processor of a computing device, the method comprising:
  executing a full crawl over a computer-executable application provided to an application repository by a developer, wherein the computer-executable application is selectable and downloadable from the application repository, and wherein the executing the full crawl comprises:
    causing the computer-executable application to execute a navigation script, wherein the computer-executable application outputs pages when executing the navigation script, and wherein the computer-executable application retrieves data from a network-accessible data repository for inclusion in the pages; and
    writing the pages output by the computer-executable application to a computer-readable data store; and
  executing a fast crawl over the computer-executable application subsequent to the executing of the full crawl, wherein the executing of the fast crawl is based upon the pages output by the computer-executable application during the full crawl.

14. The method of claim 13, wherein executing the full crawl over the computer-executable application comprises causing the computer-executable application to execute the navigation script multiple times with different respective input parameters.

15. The method of claim 14, wherein the different respective input parameters are different geographic locations provided to the computer-executable application.

16. The method of claim 15, wherein executing the fast crawl over the computer-executable application comprises providing the computer-executable application with geographic locations at a granularity learned through analysis of the pages output by the computer-executable application during the full crawl, the granularity selected based upon a time constraint set forth for the fast crawl.

17. The method of claim 13, wherein executing the fast crawl over the computer-executable application comprises causing the computer-executable application to output a subtree of pages from the pages output during the full crawl.

18. The method of claim 13, wherein executing the fast crawl over the computer-executable application comprises writing pages output by the application during the fast crawl to the disk, the method further comprising:
  receiving a query;
  executing the query over a searchable index, the searchable index based upon the pages written to the disk; and
  presenting search results located in the searchable index.

19. The method of claim 13, wherein executing the fast crawl over the computer-executable application comprises retrieving at least a portion of the data from the network-accessible repository based upon a uniform resource locator from which the computer-executable application retrieved data during the full crawl.

20. A computer-readable storage medium comprising instructions that, when executed by a processor, cause the processor to perform acts comprising:
  receiving a computer-executable application, the computer-executable application configured for installment on a client computing device and, when executed at the client computing device, retrieves data from the Internet;
  executing a full crawl over the computer-executable application, wherein executing the full crawl comprises:

executing the computer-executable application in an emulator to cause the computer-executable application to output a plurality of pages, each page in the plurality of pages comprising content retrieved during runtime of the application from the Internet; and writing the plurality of pages to a data repository;

receiving a time constraint;

identifying a subset of the plurality of pages based at least in part upon an amount of time taken to retrieve respective content for inclusion in a page from the Internet during the full crawl and the time constraint; and executing a fast crawl over the computer-executable application, wherein executing the fast crawl comprises executing the computer-executable application in the emulator to cause the computer-executable application to output the subset of the plurality of pages.

\* \* \* \* \*